Aug. 7, 1945.　　　F. CARTLIDGE　　　2,381,109
GATHERING AND LOADING MACHINE
Original Filed Oct. 19, 1942　　5 Sheets-Sheet 3
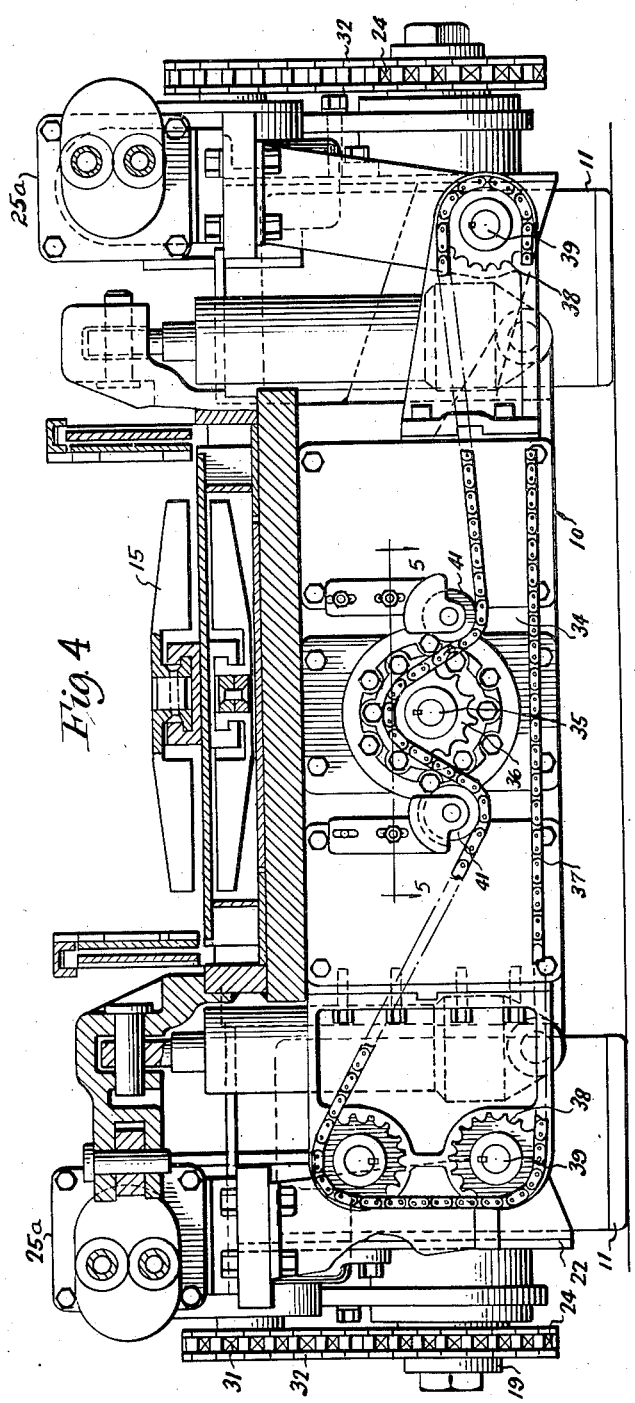
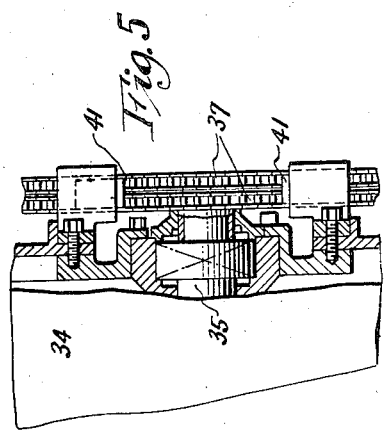
INVENTOR
Frank Cartlidge
Clarence F. Poole
ATTORNEY

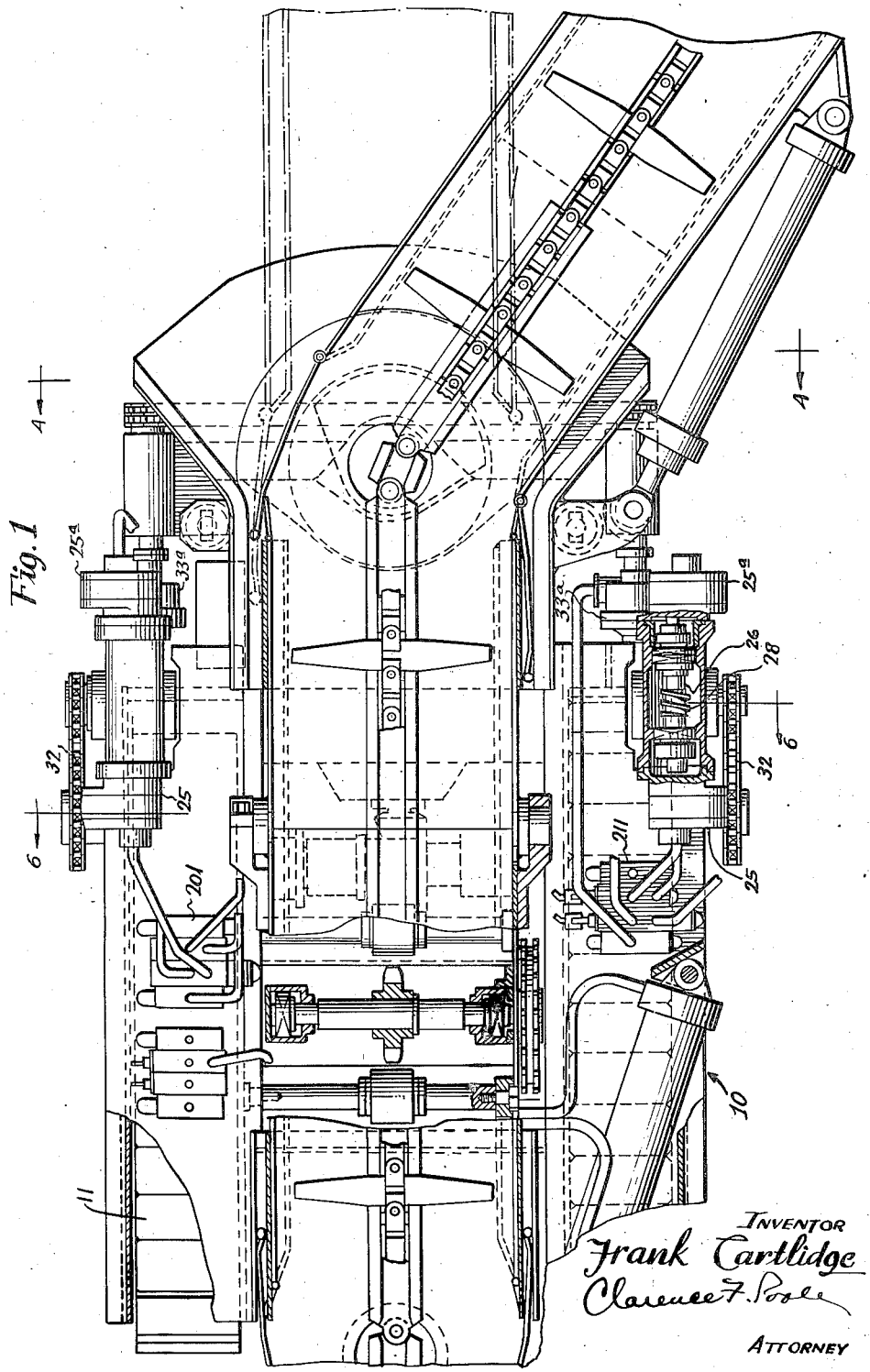

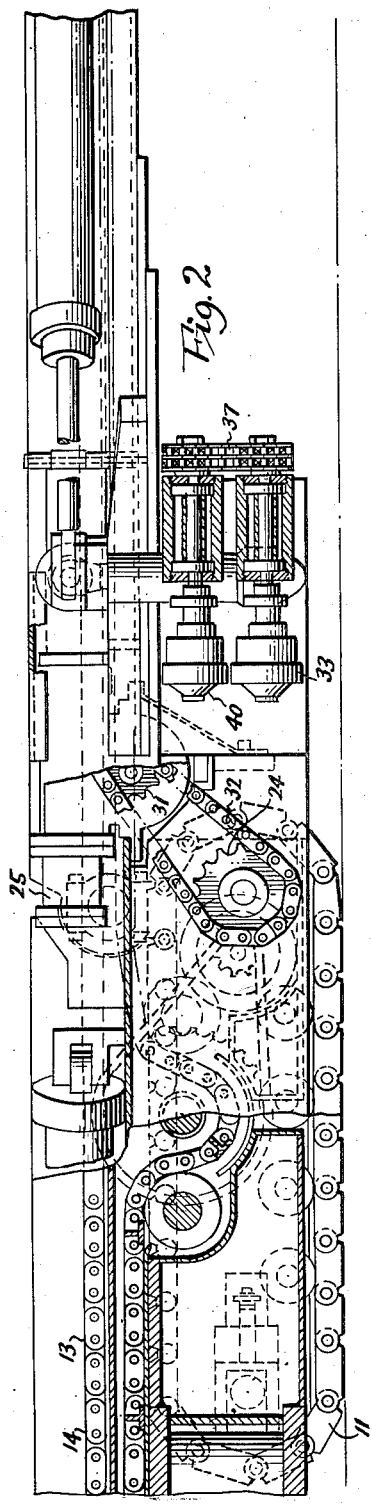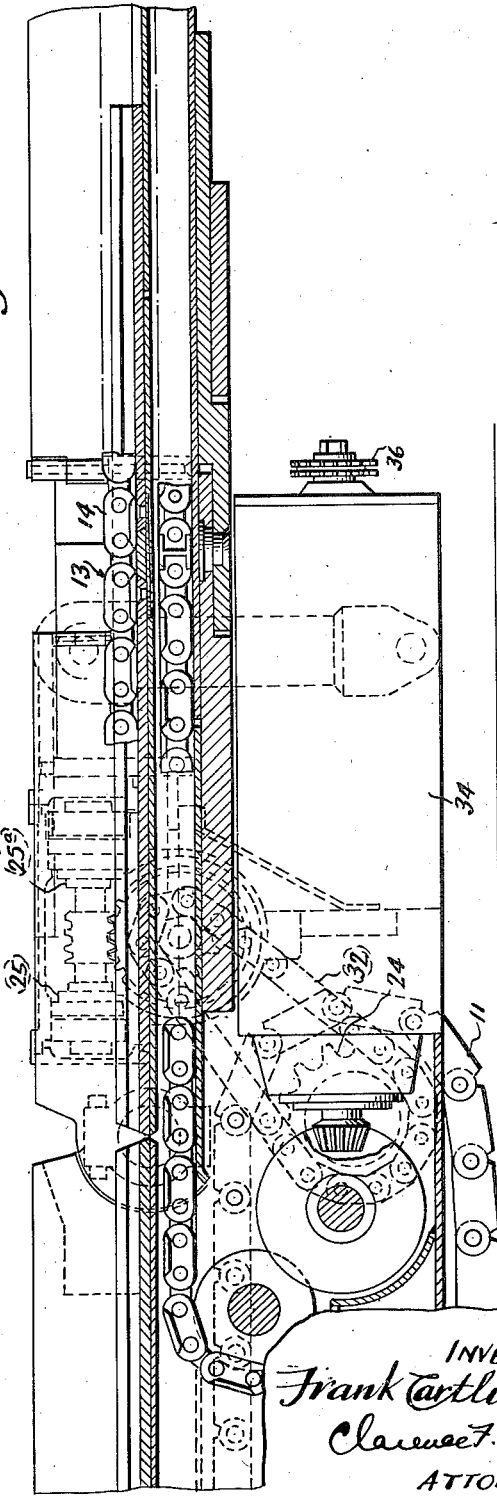

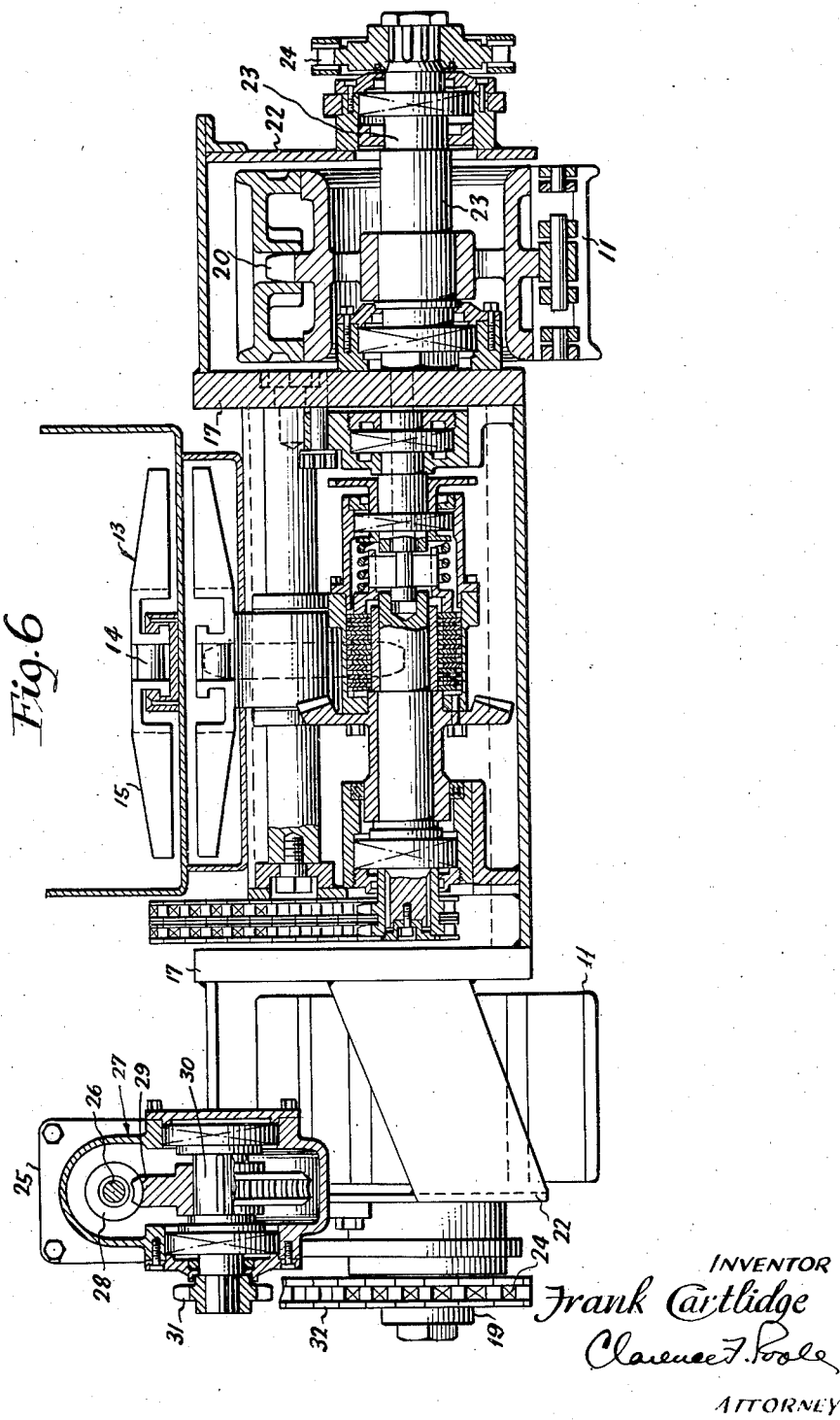

Aug. 7, 1945. F. CARTLIDGE 2,381,109
GATHERING AND LOADING MACHINE
Original Filed Oct. 19, 1942   5 Sheets-Sheet 5
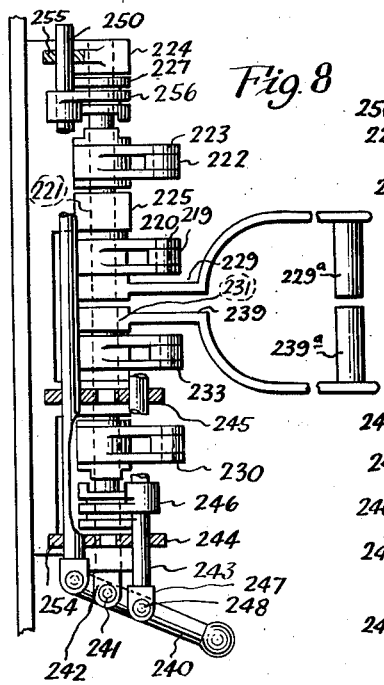
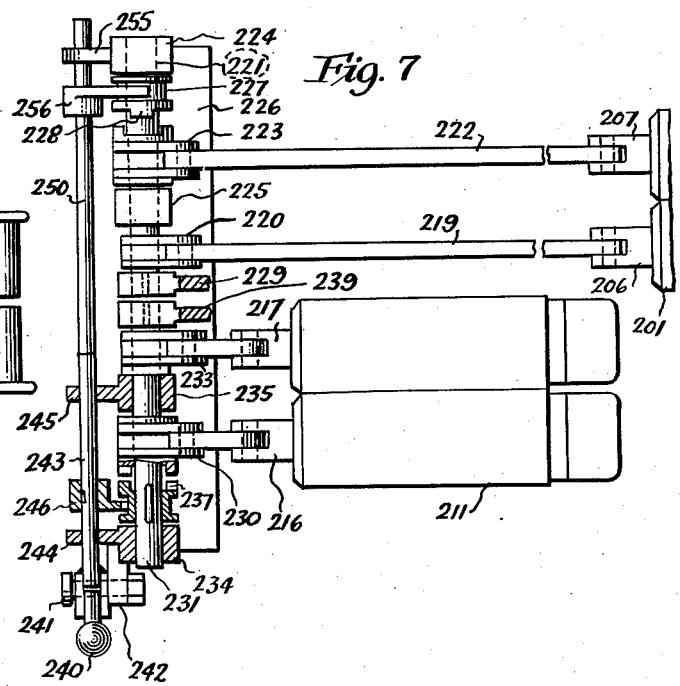
INVENTOR
Frank Cartlidge
Clarence F. Poole
ATTORNEY.

Patented Aug. 7, 1945

2,381,109

UNITED STATES PATENT OFFICE 2,381,109

GATHERING AND LOADING MACHINE

Frank Cartlidge, Chicago, Ill., assignor to Goodman Manufacturing Company, Chicago, Ill., a corporation of Illinois Original application October 19, 1942, Serial No. 462,506. Divided and this application May 27, 1943, Serial No. 488,644

4 Claims. (Cl. 180—9.2)

This invention relates to improvements in gathering and loading machines adapted to load coal or other loose material at the working face of a mine.

The principal objects of the invention are to provide a simple and efficient machine of the character described, mounted on endless treads, designed to operate in low seams of coal, and provided with hydraulic operating and control devices affording greater ease and flexibility of manipulation and control, with a resultant increased loading capacity over former machines used for this purpose.

This application is a division of application Serial No. 462,506, filed October 19, 1942.

Other objects of the invention will appear from time to time as the following specification proceeds, and with reference to the accompanying drawings, in which:

Figure 1 is a fragmentary top plan view showing the main part of the machine, with the rear or discharge end of the main conveyer broken away, and with certain other portions shown in section;

Figure 2 is a vertical section taken on certain longitudinal planes and showing the main part of the machine;

Figure 3 is an enlarged detail section, showing the rear part of the machine, taken generally along the center line of the conveyer;

Figure 4 is a transverse section taken generally on line 4—4 of Figure 1;

Figure 5 is a detail section taken on line 5—5 of Figure 4;

Figure 6 is a transverse section taken on line 6—6 of Figure 1;

Figure 7 is a fragmentary detail view showing certain hydraulic valves and an interlocking control mechanism therefor;

Figure 8 is an end view of the valve control mechanism shown in Figure 7;

Figure 9 is a side view of the valve control mechanism shown in the preceding figures;

Figure 10 is an enlarged detail section of a part of the valve control mechanism; and Figure 11 is a diagram of a part of the hydraulic system for operating the tramming motors, and the control means for steering and providing high and low speeds, including the interlocking control mechanism shown in the preceding Figures 7 to 10.

Referring now to details of the embodiment of my invention illustrated in the drawings, the main elements of the machine consist of a main frame 10 mounted on a pair of endless treads 11, 11 and having an inclined gathering element or loading head (not shown) disposed in advance of said main frame, and a conveyor 12 extending from the gathering element rearwardly over the main frame and beyond the rear end of the latter in overhanging position so as to discharge material into mine cars or the like. Said conveyer is of the single center strand endless chain and flight type including an endless chain 14 having spaced apart flights 15, 15 secured thereto and projecting laterally therefrom in opposite directions.

The endless treads 11, 11 are suitably mounted at opposite sides of side frame members 17, 17 of the main frame 10 on drive sprockets 20, 20 near the rear end of the frame, idler sprockets 21, 21 at the front of the frame, and a plurality of intermediate bogie wheels 21a, 21a. Said sprockets and bogie wheels are supported on suitable shafts which have bearing at their inner ends on the main frame and at their outer ends in overhanging brackets 22 at opposite sides of the frame. Details of the endless tread structure and its supporting means need not be described further, as they form no part of the present invention, excepting to point out that drive shafts 23, 23 of the drive sprockets 20 project outwardly beyond the overhanging supporting brackets 22, 22 and have chain driving sprockets 24, 24 fixed thereon to provide independent driving connections for each of said endless treads from a pair of hydraulic motors 25, 25a mounted at each side of the main frame (see Figure 6).

The drive connections from each pair of hydraulic motors 25, 25a to its respective endless tread are shown in detail in Figures 1 and 6. Each pair of said motors are connected to opposite ends of a common drive shaft 26 extending between them, in a casing 27, and having a worm 28 thereon meshing with a worm gear 29 on shaft 30. The shaft 30 also has bearing in casing 27, with its outer end extending beyond the latter, and having a chain sprocket 31 fixed thereon. A chain 32 connects sprocket 31 with the drive sprocket 20 of the endless tread. As will hereinafter more fully appear, the hydraulic motors 25, 25a are arranged to be operated either singly, or both at one time, so as to provide high and low speed drive for their respective treads.

Hydraulic power is supplied to the motors 25, 25a from a pair of pumps 33, 33a mounted at opposite sides of the main frame rearwardly of the endless treads. Said pumps may be of any well known form, such as the gear type, and are driven from an electric motor 34 mounted at the rear end of the main frame beneath the conveyer 13, as shown in Figures 1, 2 and 4. The motor 34 has an armature shaft 35 extending longitudinally of the machine, with its rear end projecting beyond its motor casing and having a chain drive sprocket 36 thereon. The hydraulic pumps 33, 33a are driven from said chain sprocket by a pair of continuous chains 37, 37, passing over sprockets 38, 38 of drive shafts 39, 39 of said pumps, as shown in Figure 4. Similarly, the chains 37 drive another hydraulic pump 40, disposed above one of the pumps 33, and providing fluid pressure for other hydraulically operated power devices of the machine, as will present appear. As shown in Figure 4, the chains 37, 37 are engaged by a pair of idler rollers 41, 41 at opposite sides of the drive sprocket 36, so as to increase the wrap of said chains over the latter.

The hydraulic drive system and valve control means for propelling and steering the machine by means of the two endless treads 11, 11 will now be described in connection with Figures 8 to 10, showing details of the hydraulic valve control means, and Figure 11, showing a diagram of the hydraulic system associated therewith.

As previously mentioned, each endless tread 11 is driven individually from a pair of hydraulic motors 25, 25a, which are connected to opposite ends of the drive shaft 26 of the drive gearing, and are arranged to be driven either singly or both at one time, so as to provide high and low speed drive for their respective treads. For this purpose, the two pairs of motors 25, 25a are reversible, and are connected to the hydraulic pumps 33, 33a in the following manner, as shown in Figure 11:

The pump 33 is connected by pipe 200 to a control valve 201 which serves both of the motors 25, 25a at one side of the machine through similar supply pipes 202, 203 connected to one side of each of said motors, and other supply pipes 204, 205, connected to the other side of each of said motors. The control valve 201 is of the dual type commonly employed in hydraulic systems and having two movable valve plunger members 206 and 207, each movable into three positions, so that in one position, fluid from pipe 200 will flow out of the pipes 202 and 203 to their respective motors, and be returned from said motors through pipes 204 and 205 to said valves, and from thence through a low pressure line 208 to sump 209. In a second position of said valve plunger members, the motor supply pipes leading to their respective motors are cross-connected in valve 201 so that their respective motors are not driven in either direction, but may run idly, if the other motor is being driven. In the third position of said valve plunger members, the flow of fluid is reversed through the motor supply pipes, so as to drive the respective motors in a reverse direction.

The pump 33a is connected to the two motors 25, 25a on the opposite side of the machine in a similar manner, by a high pressure line 210 leading to a dual control valve 211, having two valve plunger members 216 and 217. Fluid supply lines 212 and 214 lead from one side of said valve to opposite sides of one of the motors 25 while supply lines 213 and 215 lead from the other side of said valve to opposite sides of the other motor 25a. A low pressure line 218 leads from the valve 211 to sump 209.

It will now be understood that each pair of motors 25, 25a may be controlled so that the tread 11 driven by such pair can be selectively operated forwardly or in reverse, either by one motor or by both, driven from the same supply pump. When both motors are being driven, however, it will be seen that they are connected in parallel with each other so that the output of their supply pump will be equally divided between them. Accordingly, the driving speed will be less when both motors are being operated simultaneously than when one motor is being used, but the aggregate torque from both motors effective to drive the tread will be correspondingly increased. Thus the two treads can be selectively operated either with a relatively high speed, low torque drive, or a relatively low speed, high torque drive.

The valve control mechanism shown in Figures 8 to 10 affords means for effecting simultaneous forward or reverse drive of the two treads when driven either by one or both motors, and also provides an automatic interlock so that said treads can only be simultaneously connected either for two-motor or single-motor drive, and never for single-motor drive of one tread and two-motor drive of the other tread.

The dual control valves 201 and 211 shown in Figure 7 are preferably located at opposite sides of the machine (see Figure 1) so as to be adjacent their respective pairs of tread operating motors 25, 25a for each of the treads 11, 11. The operating plunger 206 of valve 201 is connected by an elongated rod 219 to a lever 220 suitably fixed on a shaft 221 forming part of the manual control device. The other plunger 207 of valve 201 is connected by an elongated rod 222 to a lever 223, loosely mounted near the outer end of shaft 221. Said shaft has bearing in supports 224, 225 mounted on a suitable base 226. A sliding clutch sleeve 227 is feathered on shaft 221 next to lever 223, and has clutch teeth 228 adapted to engage said lever when moved toward the latter. A manual control lever 229 is fixed on the inner end of shaft 221.

The plungers 216 and 217 of valve 211 are connected to levers 230 and 233 which are part of a second hand lever control device similar to that just described in connection with valve 201. This second control device includes a shaft 231, mounted in supports 234, 235 concentric with the shaft 221 of the first control device, but independent thereof. The lever 230 is fixed on shaft 231, while lever 233 is normally rotatable thereon, but may be operatively connected thereto by a sliding clutch sleeve 237 feathered on said shaft. The manual control lever 239 of the second control device is connected to the inner end of shaft 231. As shown in Figure 8, the two manual control levers 229 and 239 are preferably formed with outwardly bowed outer ends, having similar cylindrical handle members 229a and 239a respectively, extending toward each other and almost meeting, so as to form in effect separate halves of a single handle device similar in shape to a spade handle. The arrangement is such that the two manual control members 229 and 239 are particularly adapted to be moved in unison in either direction when grasped by the hand, but if desired, said control members can be moved independently of each other, for steering the machine, as will presently appear.

The interlocking mechanism is provided to connect or disconnect levers 223 and 239 simultaneously with their respective shafts 221 and 231, so that one of the manual control levers 229 or 239 cannot be operatively connected with both of its respective valve plungers while the other handle is connected to one plunger. In the form shown herein, said interlocking mechanism includes a rocking lever 240 pivoted on pin 241 fixed in a support 242 near the outer end of shaft 231. A push rod 243 extends parallel with the shaft 231, slidably supported in brackets 244, 245 which are herein carried on the shaft supports 234 and 235 respectively. A shifter fork 246 is fixed on the rod 243, and extends inwardly into engagement with the sliding clutch member 237. The push rod 243 is connected to rocking lever 240 above its pivot 241 by a clevis 247 and pin 248, the latter moving in an elongated slot 249 in said lever (see Figure 10).

A second push rod 250 is connected to the lower end of rocking lever 240 by a similar clevis 251 and pin 252 moving in slot 253. Said last named push rod extends to the far end of shaft 221 and is slidably supported in brackets 254, 255, the latter extending from the shaft support 224. A shifter fork 256 is fixed on push rod 250, and extends into engagement with the sliding clutch member 227.

The operation of the interlocking mechanism just described is as follows: When the rocking lever 240 is in the position shown in Figures 7 and 8, the clutch sleeves 227 and 237 are both disengaged, so that the valve control levers 229 and 239 will only be operatively connected to one of the plungers (herein plungers 206 and 217) of their respective valves 201 and 211. In this position of the rocking lever 240, therefore, the control levers 229 and 239 may be manipulated to cause the treads 11, 11 to be operated by single motors either forwardly or rearwardly, in unison, or independently of each other in opposite directions, or stopped. When the hand lever 240 is shifted to engage the clutch sleeves 227 and 237, the control levers 229 and 239 may be manipulated in the same manner to cause the treads 11, 11 to be operated either forwardly or rearwardly in unison, or independently of each other in opposite directions, or stopped, but in this case each of said treads are driven by two motors, so will be operated with a relatively higher torque but at a lower speed, than when driven by one motor. Thus the machine can be controlled and steered either at relatively high or low speeds, as desired.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a vehicle having a pair of endless treads, a hydraulic drive for said treads consisting of hydraulic pressure supply means, a pair of hydraulic motors having common operative connection to each of said treads for driving them independently of each other, independently operable valve control means for selectively connecting said pressure supply means to one or both of each pair of said motors, so as to drive their respective treads at different speeds, and interlocking means for said valve control means causing the two treads to be driven either by one only or by both of its motors, at any one time but preventing one tread from being driven by one of its motors while the other tread is driven by both of its motors.

2. In a vehicle having a pair of endless tread propelling devices, independent hydraulic drive mechanisms for said treads, each of said drive mechanisms including a pair of motors having common drive connections with its respective tread, hydraulic supply means for each pair of motors, having individual valves for controlling the operation of said motors in either direction, separate control means for independently operating said valves for each motor, and interlocking means between said control means for the two pairs of valves for both treads, affording simultaneous operation of all four valves in one position, but permitting operation of only one valve of each pair in another position to prevent one tread from being driven by one of its motors while the other tread is driven by both of its motors.

3. In a vehicle having a pair of endless tread propelling devices, independent hydraulic drive mechanisms for said treads, each of said drive mechanisms including a pair of motors having common drive connections with its respective tread, hydraulic supply means for each pair of motors, having individual valves for controlling the operation of said motors in either direction, and interlocking means between the two pairs of valves for both treads, affording simultaneous operation of all four valves in one position, but permitting operation of only one valve of each pair in another position, said interlocking means including a manual control lever for each pair of valves, said control levers being disposed side by side and arranged to be moved together in one direction to move one or both of their respective valves into position for driving the tread in one direction, and to be moved together in another direction, to move one or both of their respective valves into position for driving the tread in an opposite direction.

4. A vehicle having a pair of endless tread propelling devices, a pair of independently operated, hydraulic drive mechanisms of substantially equal power for said tread devices, each including a pair of motors having common drive connections with its respective tread device, hydraulic supply means for said motors including a pair of individual control valves for effecting the operation of each pair of said motors in opposite directions, two manual control levers, each of said control levers having direct connection with one control valve of one pair of valves, means affording operative connection of said control levers with the second valve of their respective pairs of valves, and interlocking means controlling the last named operative connections so that both treads will, at any one time, be driven by an equal number of motors, whether in the same or in reverse directions.

FRANK CARTLIDGE.